United States Patent [19]

Pajak et al.

[11] Patent Number: 5,065,347
[45] Date of Patent: Nov. 12, 1991

[54] HIERARCHICAL FOLDERS DISPLAY

[75] Inventors: Henry G. Pajak, Ontario; Daniel S. Marder, Penfield; Kenneth C. Byrne, Henrietta, all of N.Y.; Lee F. Breisacher, Redondo Beach, Calif.

[73] Assignee: Xerox Corporation, Stamford, Conn.

[21] Appl. No.: 231,020

[22] Filed: Aug. 11, 1988

[51] Int. Cl.$^5$ .................................. G06F 3/14
[52] U.S. Cl. .................... 395/159; 340/721; 395/160
[58] Field of Search ........ 364/518, 521, 200 MS File, 364/900 MS File; 340/706–710

[56] References Cited

U.S. PATENT DOCUMENTS

| | | |
|---|---|---|
| D. 295,631 | 5/1988 | Wells-Papanek et al. .............. 18/27 |
| D. 296,705 | 7/1988 | Wells-Papanek et al. .............. 18/27 |
| 4,429,385 | 1/1984 | Cichelli et al. ........................ 370/92 |
| 4,531,186 | 7/1985 | Knapman ............................. 364/300 |
| 4,601,003 | 7/1986 | Yoneyama et al. ................... 364/518 |
| 4,642,790 | 2/1987 | Minshull et al. ..................... 364/900 |
| 4,646,250 | 2/1987 | Childress ............................. 364/518 |
| 4,712,191 | 12/1987 | Penna ............................. 364/521 X |
| 4,761,642 | 8/1988 | Huntzinger ..................... 340/723 X |
| 4,772,882 | 9/1988 | Mical .............................. 364/521 X |
| 4,813,013 | 3/1989 | Dunn ................................... 364/900 |
| 4,819,189 | 4/1989 | Kikuchi et al. ................. 340/723 X |
| 4,845,644 | 7/1989 | Anthias et al. ...................... 364/521 |
| 4,852,019 | 7/1989 | Vinberg et al. ..................... 364/521 |
| 4,860,204 | 8/1989 | Gendron et al. ............... 364/518 X |
| 4,862,390 | 8/1989 | Weiner .......................... 340/711 X |
| 4,866,638 | 9/1989 | Cosentino et al. ................... 364/521 |
| 4,868,766 | 9/1989 | Oosterholt ........................... 364/522 |

OTHER PUBLICATIONS

Macintosh, Apple Computer, Inc., 1983, pp. 100-109.

Anonymous, International Technology Disclosures, vol. 5, No. 1, 25 Jan. 1987, #18703.
Timeworks Word Writer ST User Manual, Timeworks Inc., 1982, pp. 65–69.
Macintosh MacWrite, Apple Computer, Inc., 1983, pp. 62–65, 123–125.
Macintosh, Apple Computer, Inc., 1984, pp. 18–19.

*Primary Examiner*—David L. Clark
*Attorney, Agent, or Firm*—Ronald F. Chapuran

[57] ABSTRACT

Method and apparatus of accessing and displaying hierarchical files on an electronic workstation screen that includes: (1) an Open Next-To operation that opens a separate window for a file to prevent the window from which the file was originally opened from being obscured, (2) a combination of both Open Next-To and Open-Within operations for opening different combinations, (3) "Chording" for displaying general options and depth display options to give the user a choice of a window OPEN method and hierarchical display depth as well as a choice of selecting "display all levels" format, (4) a FIND capability that enables finding of strings in a folder display, including forward and backward search and automatic text type conversion based on selection, (5) Iconic Pretty-Printing, that is, the icon optionally combined with text is offset as a function of its depth in a hierarchy including, (6) Folding of the display when the indentation reaches a desired column width, (7) a visual method of indicating the extent of the contents of a folder or directory, including visual highlighting indicating the files that will be affected by any operation, e.g. copy, move, or delete, and (8) the visualization of nested hierarchical relationships for movement of icons and folders.

2 Claims, 8 Drawing Sheets

HIERARCHICAL FOLDERS DISPLAY

BACKGROUND OF THE INVENTION

The invention generally relates to computer workstation/user interfaces and, more particularly, to a method of accessing and displaying hierarchical folders and files to provide the user with increased ease in relating and associating structured data objects such as main files with subordinate files on a display.

The increasing proliferation and utility of professional workstations and personal computers has required the design of user-friendly computer and workstation interfaces. One technique in improved interfaces has been in the area of touch-screen data input. For example, U.S. Pat. No. 4,649,499 discloses a touch screen to emulate three-dimensional objects on a two-dimensional computer screen.

In addition, U.S. Pat. No. 4,601,003 to Yoneyama et al. discloses a system for document editing, rearrangement and retrieval wherein pictorial representations of filing item displayed on a screen are used to manipulate the documents. Graphic representatives of folder represent documents which may be manipulated. A hierarchical display of positions for placing the document is provided, whereby an operator may choose where a document (folder) is to be placed from pictorial images representing, for example, a filing cabinet, a desktop or a waste paper basket. Additionally, menus are provided to assist in the labeling, editing and filing of documents.

U.S. Pat. No. 4,646,250 to Childress discloses an interactive data entry system in which erroneous information entered by a user is redisplayed so that the user can readily identify data that must be corrected. Specifically, erroneous information is redisplayed in highlight in order that the user may identify the erroneous information.

U.S. Pat. No. 4,429,385 to Cichelli et al. discloses an information retrieval method, for retrieving information from broadcast information, which supports both hierarchical and relational access to the broadcast information. Cichelli teaches a menu selection sequence which allows a user to choose a level in a hierarchy of messages simply by moving a cursor to the next desired menu item and pressing a button. The user interface consists of a keypad and displays. The displays consist of menus, key word or key phrase search term displays and data frames.

U.S. Pat. No. 4,531,186 to Knapman discloses a data base management system wherein each data base in the system consists of a single hierarchical structure. In order to access information in the data base, the data base is displayed to a user as a menu from which different levels (segments, fields) can be accessed.

U.S. Pat. No. 4,642,790 to Minshull et al. discloses an interactive display system capable of displaying selected windows of data supplied to or generated by the system in the course of performing one or more applications involved by a user.

A structured data object generally means a data object that contains a series of other data objects linked together in a predetermined manner that may or may not include a visual representation or functional abstraction on a display screen. Such data objects may have an associated set of operations and be linked to one another for one or more functional purposes. An example of a structured data object is the electronic versions of a work space or desktop as defined by the display screen. A typical screen display contains multiple structure data objects, such as file folders or documents represented on the screen as icons, in turn containing other structured data objects. For example, a file folder may contain several documents, other file folders or a file drawer. A structured data object that is capable of holding other structured data objects is also referred to in the art as a "container", that is, a file folder is a container for documents. An example of a container is the file folder of the MacIntosh Computer of Apple Computer, Inc. that may contain a plurality of other file folders displayed in their iconic representation of individual folders.

As is known in the art, the representation and display of structured data objects in a workstation environment may take various forms. A common technique is to present the contents or entries of structured data objects in a display region or work space, such as a view window, on a CRT display. In order to maintain an unclustered display area in the displayed setting, it may be useful to provide a shrunken or miniature representation of the structured data object, such as an icon, when a user is not engaging in activities relating to the structured data object. Such a representation of data may take the form of iconic representations of different structured data objects positioned on a work space of a display screen, that is, a display illustrating an office desktop metaphor employing various abstractions of a typical office environment. The desktop metaphor represents real office objects that are accessible directly seated at a desk or only accessible by moving from a desk to another office location away from the desk. Examples of these abstractions are a desktop, inbasket, documents, file folders and "books", which contains two or more consecutive document portions which together comprise a complete document. An example of such an office metaphor is the ViewPoint TM ("VP") software system available from Xerox Corporation in connection with its 8010 and 8065 display workstations.

A difficulty with the prior art systems is the inability to display and access many distinct files that are structured in hierarches in a visually pleasing and easily accessible manner. The difficulty comes from the inability of these systems to display the hierarchy adequately, to access files existing at many different levels and to manipulate the trees of information associated with the hierarchies.

It is an object of the present invention, therefore, to provide a new and improved technique for working with hierarchical organizations of files. It is another object of the present invention to provide hierarchical tools to create, modify, and access information for document creation and publication as well as support for structured analysis and design methods. Further advantages of the present invention will become apparent as the following description proceeds, and the features characterizing the invention will be pointed out with particularity in the claims annexed to and forming a part of this specification.

SUMMARY OF THE INVENTION

The present invention is a method of accessing and displaying hierarachical files on an electronic workstation screen that includes: (1) an Open Next-To operation that opens a separate window for a file to prevent the window from which the file was originally opened from being obscured, (2) a combination of both Open Next-To and Open-Within operations for opening different combinations, (3) "Chording" for displaying general options and depth display options to give the user a choice of a window OPEN method and hierarchical display depth (either Open Next-To or Open-Within) as well as a choice of selecting "display all levels" format (This choice can be made through a pull-down menu selection item or by "chording" over an icon, either unopened, on the desk top, or in a folder opened on the desk top), (4) a FIND capability that enables finding of strings in a folder display, including forward and backward search and automatic text type conversion based on selection. Text strings or data are extracted from an icon or file and converted to a form that enables the data to be found in the folder display, a typical scenario being - to select an icon, position the cursor in the folder, press the FIND key for a find window, and the text name associated with that icon will then be searched for in the folder and highlighted or indicated in some manner if found), (5) Iconic Pretty-Printing, that is, the icon optionally combined with text is offset as a function of its depth in a hierarchy including, (6) "Folding of the display" when the indentation reaches a desired column width (In this case a folding indicator is added to indicate the presence of a deeper hierarchy represented in the form of a fold), (7) Hierarchical Selection or highlighting based on directory contents - a visual method of indicating the extent of the contents of a folder or directory, including visual highlighting indicating the files that will be affected by any operation, e.g. copy, move, or delete, and (8) the visualization of nested hierarchial relationships for the movement of icons and folders.

BRIEF DESCRIPTION OF THE DRAWINGS

For a better understanding of the present invention, reference may be had to the accompanying drawings wherein the same reference numerals have been applied to like parts and wherein.

DESCRIPTION OF THE PREFERRED EMBODIMENT

Figure 1:
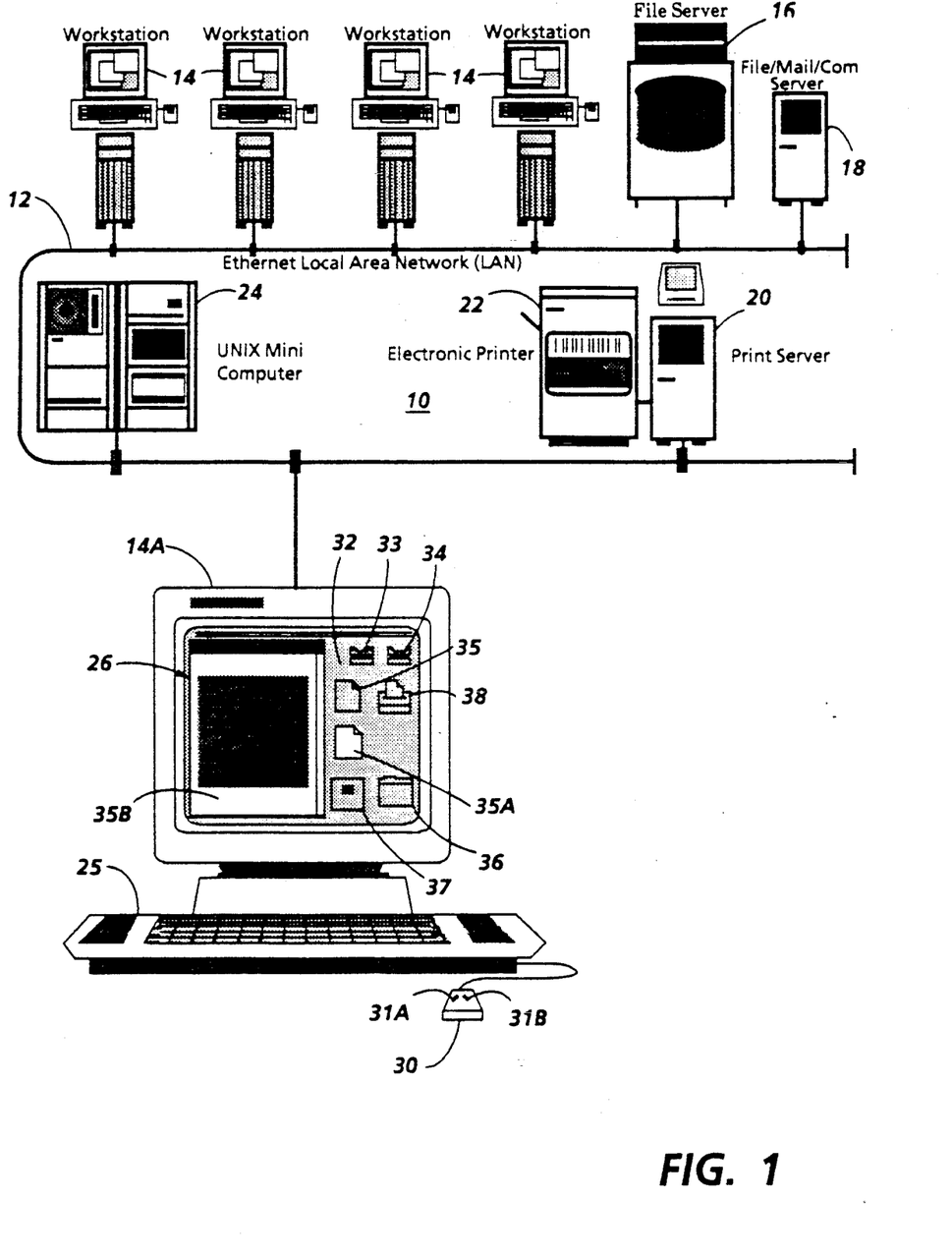
FIG. 1 is an illustration of a typical office information system incorporating the present invention.
Figure 2:
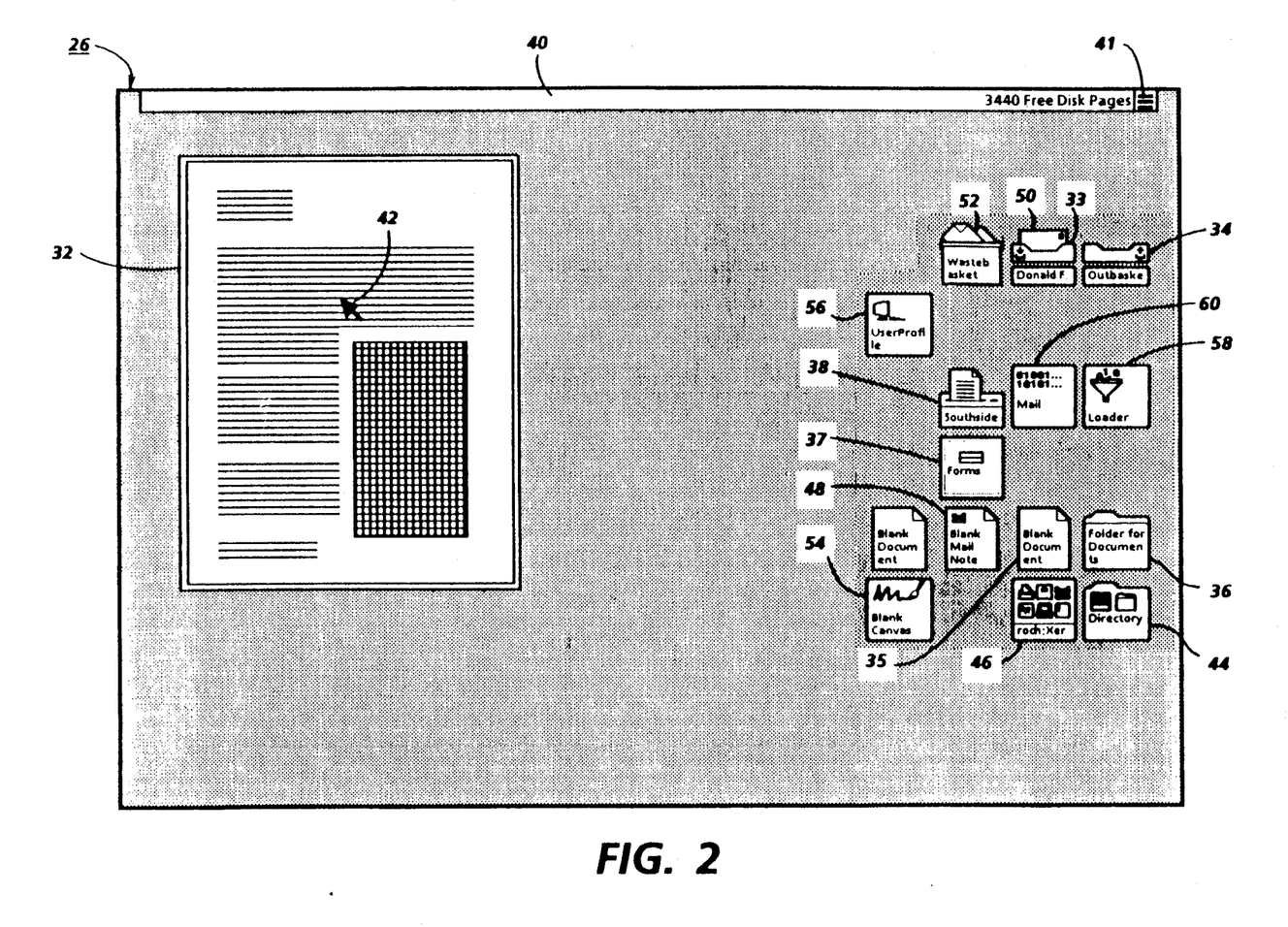
FIG. 2 is an enlarged view of the display screen of FIG. 1.

Reference is now made to a typical office information system 10 illustrated in FIGS. 1 and 2. System 10 includes an Ethernet local area network (LAN) 12, to which a number of user workstations 14, including workstation 14A is connected. Workstations 14 may be, for example, the Xerox 6085 professional workstation. Lan 12 may also have other office connected equipment such as network file server 16, network file/mail/communication server 18, printer server 20 and printer 22. Also, a large capacity remote storage facility, such as UNIX mini computer 24 may be connected to Lan 12. System 10 is a collaborative type system, meaning that it enables users at different workstations 14 to work together in real time by processing and passing information among one another and storing and retrieving information from storage services 16 and 24 via network 12. The collaborative functions of system 10 could also be centralized in a single main CPU, could be distributed among processors at the workstations, or could be provided in any combination of centralization and distribution. Similarly, Lan 12 could take any appropriate configuration capable of providing the necessary communications to support collaboration.

System 10 includes display-based user interfaces, with each workstation 14 including a display device and a user input device. In this connection, workstation 14A includes a CRT display screen 26 and keyboard 25 with a display cursor mouse 30. Mouse 30 may be, for example, an optical mouse of the type disclosed in U.S. Pat. No. 4,521,772. Mouse 30 has two buttons or microswitches 31A and 31B which are respectively referred to as the left button and the right button. As is common with mouse 30, the movement of the mouse housing on a surface causes display cursor 42 visually move on screen 26 in the same direction of mouse housing movement. Point button 31A when pressed and released, is used to indicate an object on screen 26 or to an item within an object on screen 26 in the same direction of mouse housing movement. Point button 31A, when pressed and released, is used to indicate an object on screen 26 or to an item within an object on screen 26. This point function is referred to as "clicking" the mouse button 31A or 31B. Button 33 is often used in combination with the left button 31A. For example, in selection of text, the left button 31A is a reference pointer to the beginning place of text to be selected and right button 31B is a second pointer to the end place of text encompassed by the combination of these two selections.

System 10 includes an object oriented display system that comprises icon representations of different structured data objects positioned on a work space of a display screen, e.g., a display illustrating an office desktop metaphor employing various abstractions of a typical office environment, representative of real office objects. An example of such an office metaphor is the ViewPoint TM ("VP") software system available from Xerox Corporation in connection with its 8010 and 8065 display workstations. Examples of these abstractions in FIG. 1 are a desktop 32, inbasket 33, outbasket 34, documents 35 and 35A, file folder 36, file drawer 37 and printer 38. Document icon 35A is shown "opened", in that an <OPEN> command has been invoked and opened window 35B has appeared displaying the document in full scale. Printer 38 is an iconic representation of printer 22 on Lan 12. Any document 35 moved, via a <COPY> command from keyboard 25 onto printer icon 37 will be printed at printer 22. Electronic mail is received and sent via a workstation inbasket 33 and outbasket 34, respectively, from and to other workstations on LAN 12 or to workstations on other networks via File/Mail/Com server 18.

Message area is 40 the header at the top of screen 26 for displaying system messages to a workstation user. In the example shown there is an indication of the number of free pages left on an associated disk drive. Other messages would be prompts to suggest the next action to be taken by a user such as involving a <MOVE> command from moving an object to another place on screen 26 and display of the message in header 40, "Please specify a destination". The triple bar symbol 41 at the end of header 40 is a transient or pop-up menu activated via mouse pointer button 31A held in its down position, thereby visually producing a menu which contains a list of command items which may be, for example, such items as "Date and Time", "End Session" (logoff), "Spelling Checker", etc. These subcommands are involved by moving the cursor pointer with button 31A still held in its down position over a selected item, which is then highlighted to indicate to the user its potential selection. At this point, if button 31 is released by the user, the selection is accomplished, the pop-up menu visually disappears and the command item selected is initiated.

Other commands for performing functions may be invoked from keyboard 29. These functions include <DELETE>, which will delete the object and its contents, <COPY> which will copy the object and its contents to another desktop location, <MOVE> which will move the object and its contents to another desktop location, <PROP'S> which will open a window displaying properties or parameters for a particular object and provide alternative choices for these parameters and <OPEN> which opens an object to reveal the contents of the object in a window, if the object is designated to have a content, for example, a document content.

The icons on desktop 32 are aligned vertically and horizontally according to an invisible orthogonal grid. Thus, the icon placement on desktop 32 is not arbitrary and the application software is capable of determining and keeping track of the location of icons on the surface of desktop 32. The locations of each square in the desktop grid are listed in the desktop software so that at any given time, the desktop application can determine the X, Y location of icons on its surface and also help to determine whether the positioning of one icon on top of another on the desktop is a permissible function. For example, the dropping or releasing of a document icon onto a file folder icon or on a printer icon, are both permissible functions; the dropping of one document icon onto another document icon is not a permissible function.

Many of the icons may be opened via the <OPEN> function to reveal their content, such as a list or directory of files or the content of a document. In this sense, the icons are containers representing pointers to files and other bodies of stored data. Icon 44 is a directory divider which when opened contains a plurality of directory icons, one of which is icon 46. Directory icon 46 serves as a source of icons representing shared and remote objects that the user may access, such as filing and printing services.

Icon 48 is a blank Mail Note. This icon may be copied or moved or opened, and a message typed in the open window of the icon and the icon closed after message typing. Mail icon 48 may then be moved to outbasket icon 34 where it is electronically sent to an addressee of the note. Icon 36 is a file folder into which document icons 35, 35A and mail not icon 48 may be placed. Opening of folder icon 36 will reveal a directory listing objects contained in the folder either by alphabetical order or chronologically by revision date, any one of which may be opened in the folder or moved from the folder and placed on desktop 32.

Icon 34, as mentioned, is an outbasket for electronic mail messages while icon 33 is an inbasket for receiving incoming electronic messages, such as mail note icon 48. In basket icon 33 displays a mail flag 50 indicating that there is mail to be retrieved by the addressee named on the inbasket. Icon 33 may be opened to reveal a mail window through which mail notes 48 may be accessed and opened or may be moved to the desktop and opened for reading.

Icon 37 is a file drawer for storing data icons and may be opened revealing a directory displaying the titles of documents or folders they contain which may then be individually opened or removed or copied from the file drawer. Icon 38 is a representation of printing resource. The actual printing device may be directly connected as printer 22 or may be remotely located. Document icons 35, 35A, mail note icon 48 or folder icon 36 may be moved or copied and dropped onto printer icon 38 and their content printed.

Wastebasket icon 52 is a container into which, for example, mail notes, documents or folders may be dumped for disposal but are retrievable since they are still in the container. The metaphor is that the workstation user changes his/her mind about destroying (deleting) a document or the like and removes the document from the wastebasket by opening icon 52 and moving the document icon back onto desktop 32. The contents of the wastebasket are permanently removed by a positive delete command.

Icon 54 is a freehand drawing program comprising a canvas which the user may copy graphics into or use palette tools to produce free hand drawings. Icon 56 is the User profile for desktop 32 which contains a listing of various ViewPoint applications present and supporting the desktop. Various parameters of these applications may be edited upon opening the user profile icon to change, for example, the location of window structures.

Icon 58 represents a program or application loader into which a program may be loaded and run on desktop 32. For example, mail program icon 60 comprising a mail access environment may be moved or positioned onto loader icon 58 to load a ViewPoint application in the runtime. For a more detailed description of this system, reference is made to U.S. patent application Ser. No. 856,525, filed Apr. 28, 1986 and assigned to the same designee as the present invention and incorporated herein by reference.

Figure 3:
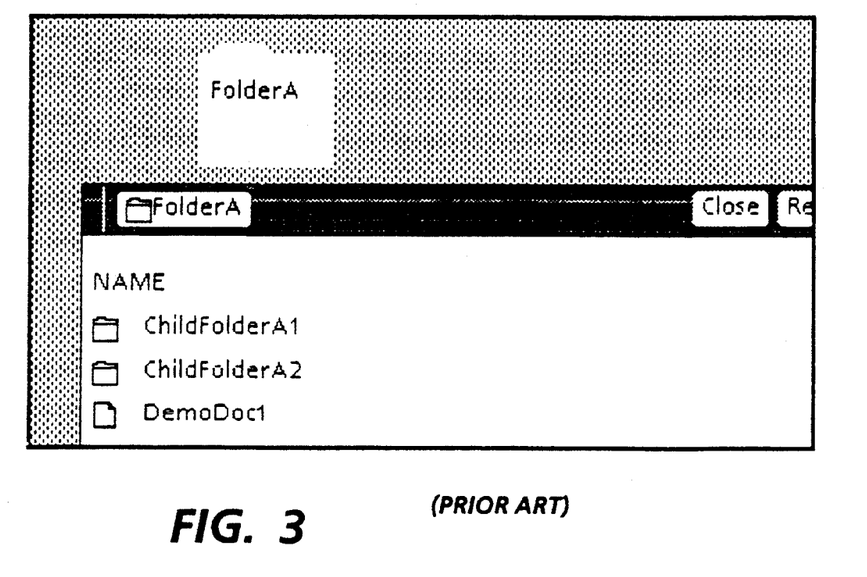
FIGS. 3 and 4 illustrate prior art methods of accessing and displaying hierarchical files.
Figure 4:
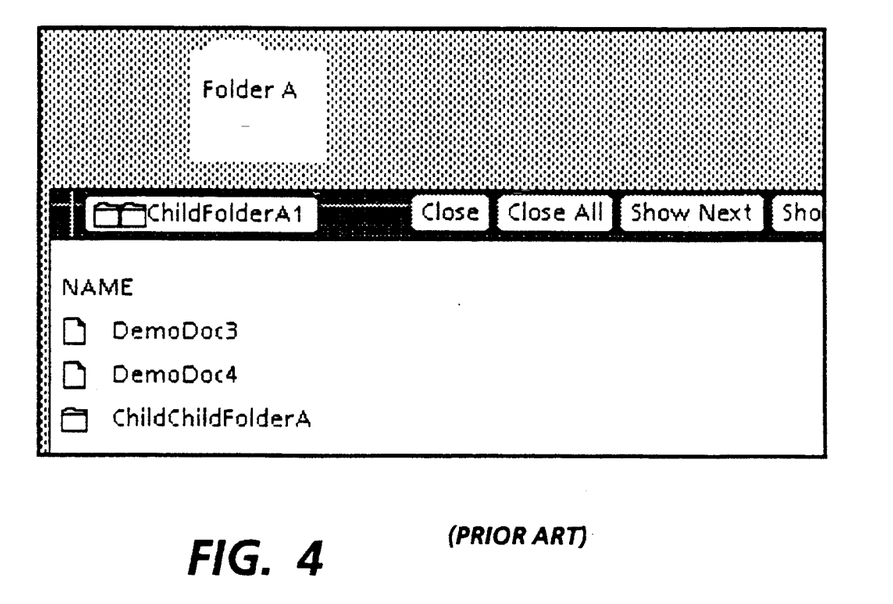

Currently, in the prior art, when a folder or file drawer is opened, the icons inside the folder or file drawer are seen. If there are folders inside the opened folder, each of those "nested" folders must be opened individually to see the icons inside of them. For example, assume FolderA is on the desktop as shown by the FolderA icon as illustrated in FIG. 3. Also, assume that when FolderA is opened, it has inside it folders Child- FolderA1 and ChildFolderA2. To see the icons inside of ChildFolderA1, it must be opened, but this then obscures the display of opened FolderA as illustrated in FIG. 4 showing ChildChild FolderA and DemoDoc3 and DemoDoc4, the documents within ChildFolderA1. When many icons are nested inside many folders inside many other folders, it is very difficult to locate files and it difficult to visualize the entire nested structure.

Figure 5:
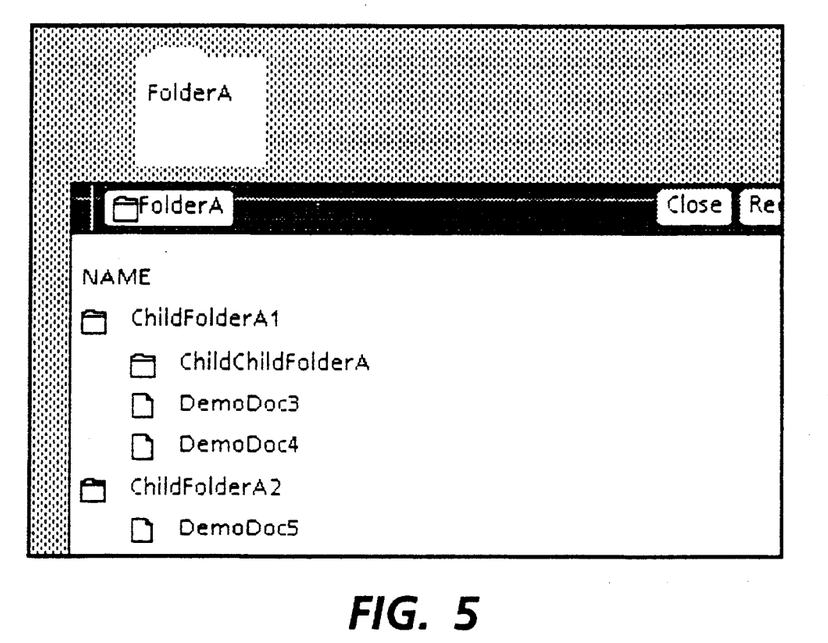
FIG. 5 is a representation of the accessing and displaying of nested hierarchical files in accordance with the present invention.

In accordance with the present invention, a hierarchically Nested Display is provided. That is, to make an entire nested structure of folders and other icons easy to observe, both a folder and the icons inside it are displayed in the same window, indenting the names of the icons inside the folder, in an outline style as illustrated in FIG. 5. For example, as shown in FIG. 5, the displayed FolderA not only illustrates the files and documents contained within FolderA, ChildFolderA1, ChildFolderA2, DemoDoc1 and DemoDoc2 (illustrated in FIG. 3) but also displays the sub files in each of the first level of files in indented form. That is, ChildFolderA1 is displayed as containing indented sub files ChildChildFolderA, DemoDoc3, and DemoDoc4, and ChildFolderA2 is displayed as containing sub files DemoDoc5 and DemoDoc6. Thus, the entire nested structure can be displayed and visualized without obscuring any of the files. This nested display can be carried to multiple levels. That is, if ChildChildFolderA contained sub files, these files could also be displayed in indented form under ChildChildFolderA.

Figure 6:
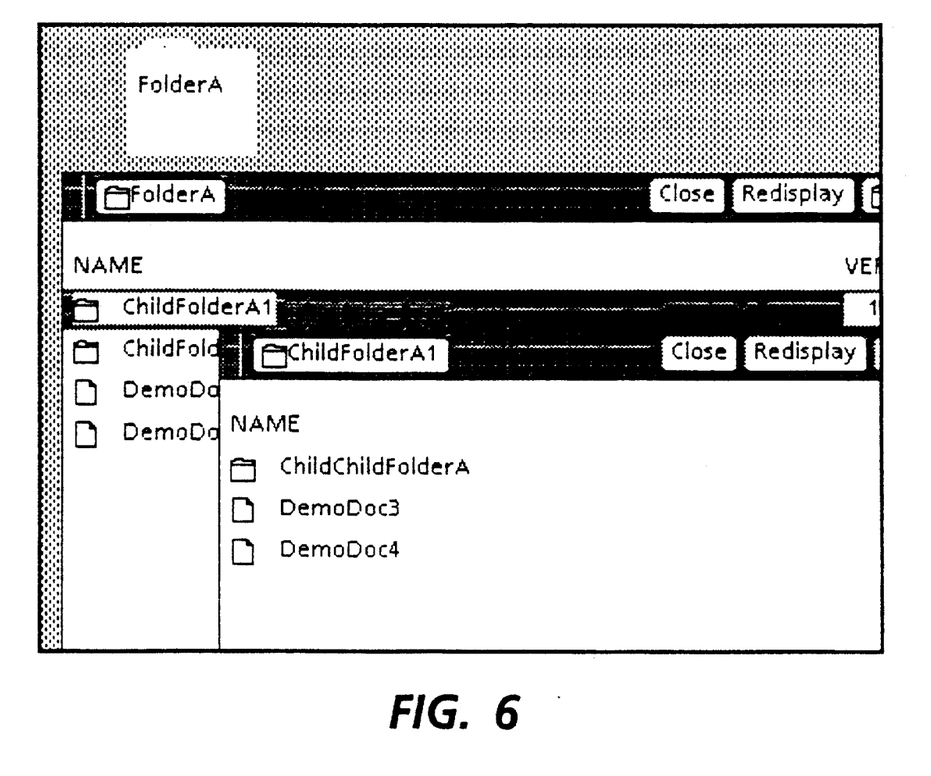
FIG. 6 is a representation of the accessing and displaying of hierarchical files into separate windows in accordance to the present invention.

In accordance with another aspect of the present invention, files or icons can be opened into a separate window rather than having an open icon or file completely obscure the window from which it was opened, as illustrated in FIG. 6. A first window displays the contents of FolderA, namely ChildFolderA1, ChildFolderA2, DemoDoc3 and DemoDoc4. This is the same display as shown in FIG. 3. However, if the work station professional desires to displays the contents of one of the files or documents in FolderA, for example, ChildFolderA1, the contents of ChildFolderA1 are displayed in a separate window. As illustrated the file ChildChildFolderA, DemoDoc3, and DemoDoc4. Contained within ChildFolderA are shown in a second window offset from the window containing the contents of FolderA.

This display can be contrasted with the prior art display, FIG. 4, wherein the window showing the contents of ChildFolderA1 obliterates the window showing the contents of FolderA. The second window gives the work station professional a nested display, thus a more comprehensive visualization of the relationship of files and documents. It should be understood that it is within the scope of the present invention to provide additional levels of separate windows containing further delineation of files, subfiles and documents.

Figure 7:
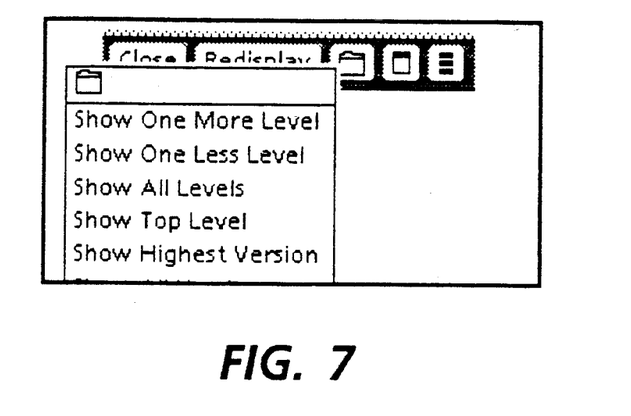
FIG. 7 is a representation of the accessing and displaying of files using a folder pop-up menu in accordance with the present invention.

In accordance with another feature of the present invention, folders and file drawers open as before, showing just the icons directly inside (as shown in FIG. 3). To display icons within the icons in the open folder or drawer window, a folder pop-up menu in the window header 40 is accessed by use of cursor 42, illustrated in FIG. 7. Various options are then available to the workstation user. For example, "Show One More Level" will display the icons inside the icons in the open folder or file drawer window by selective operation of cursor 42 and mouse 30. Selecting "Show One More Level" again will display the icons within the icons inside the icons in the open folder, as illustrated in FIG. 8.

Each level displayed is indented a bit more than the previous level. "Show One Less Level" will remove the last nested icons from the display. "Show All Levels" will show all the icons inside of all folders. "Show Top Level" will display just the icons inside the folder or file drawer that was originally opened when opened the first time.

Figure 8:
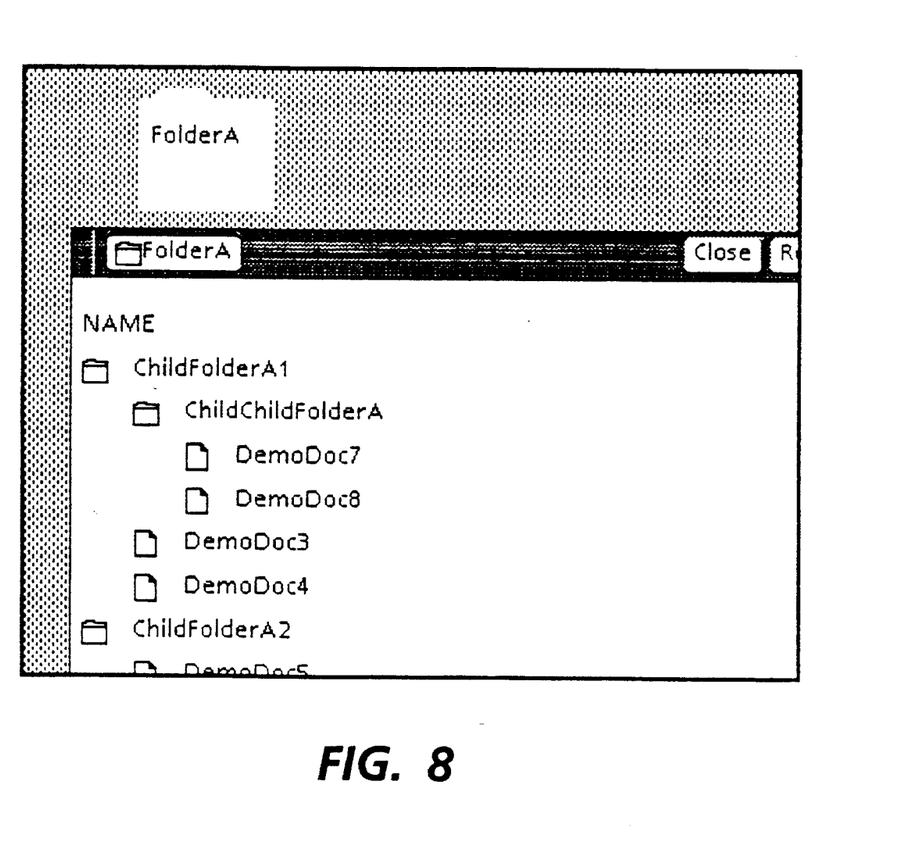
FIG. 8 is a representation of the accessing and displaying of files displayed at "one more level" in accordance with the present invention.

Thus, with reference to FIG. 8, assume the contents of FolderA are initially ChildFolderA1, ChildFolderA2, DemoDoc1 and DemoDoc2. To display one more level, the work station user would move the cursor 42 to the triple bar symbol 41 and click open the pull down menu illustrated in FIG. 7. The user would then move the cursor to the "Show One More Level" position on the pull down menu. This would cause the display of ChildChildFolderA, DemoDoc3, DemoDoc4, DemoDoc5 and DemoDoc6 as shown in FIG. 8. Repeating this sequence for showing one more level would show the complete display as illustrated in FIG. 8.

Figure 8A:
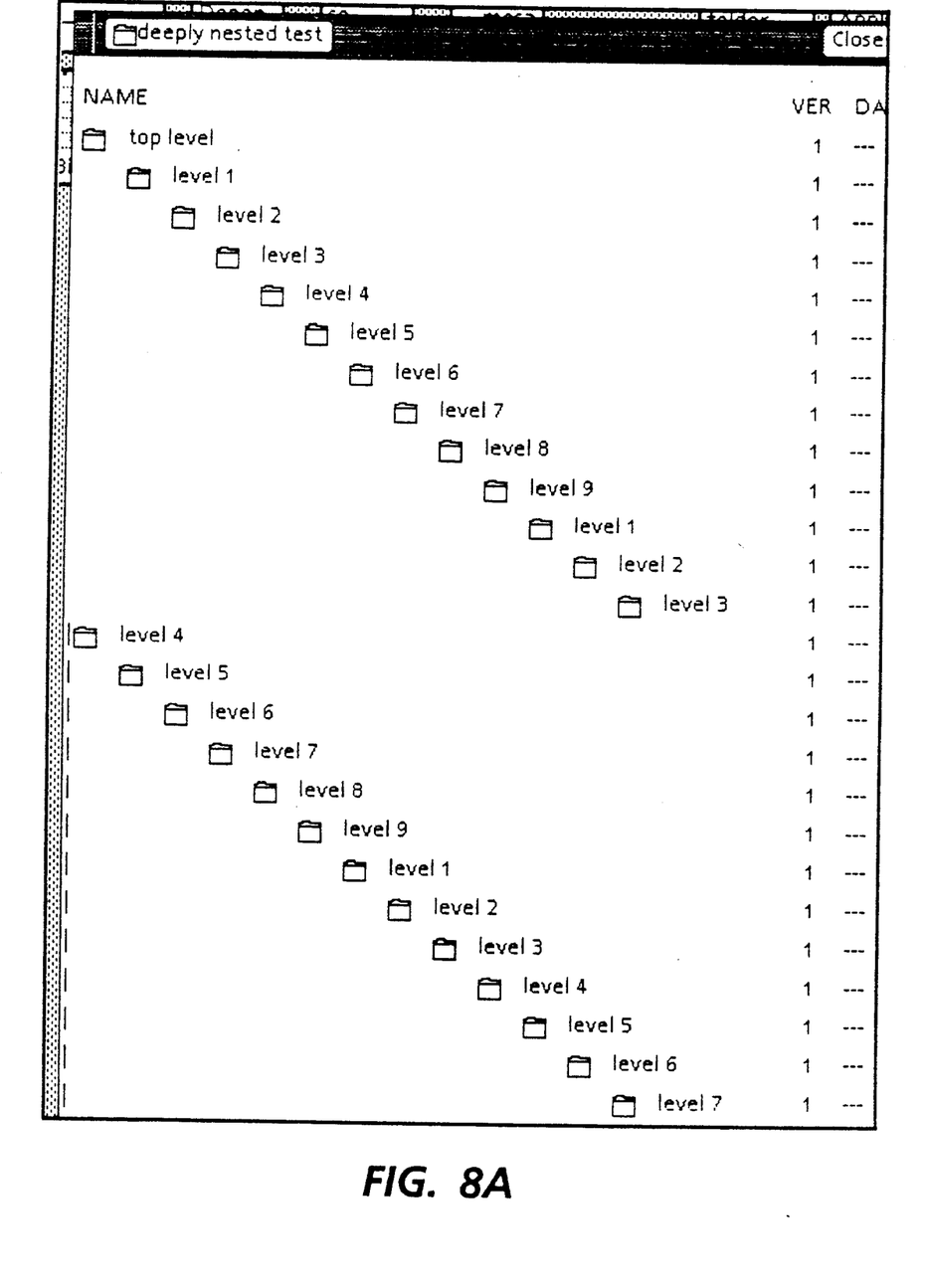
FIG. 8A is an illustration of Display Wrap-around in accordance with the present invention.

Since the icon names at each level are indented a bit more than the previous level, icons beyond a certain nesting level would not fit in the NAME column. This is handled by "wrapping around" and starting over at the left edge, but with a vertical bar character at the left edge to indicate that the level is actually is actually much more than the indenting indicates as illustrated in FIG. 8a.

Figure 9:
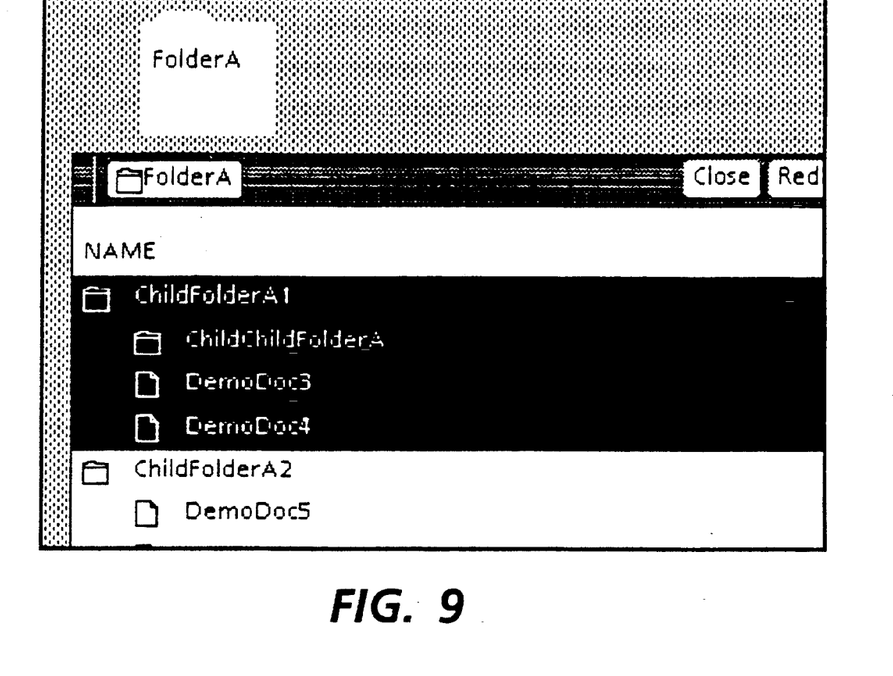
FIG. 9 is a representation of the display of files and automatic selection in accordance with the present invention.

When a folder and the icons inside it are both visible, selecting the folder will automatically select all the icons inside it as shown in FIG. 9. That is, by selecting ChildFolderA1, ChildFolderA, DemoDoc3, and DemoDoc4 are also automatically selected. Thus, operations on the folder ChildFolderA1, will also operate on the icons inside the folder. For example, deleting the folder will also delete all the icons inside the folder. Copying or moving the folder will copy or move the icons inside as well.

Figure 10:
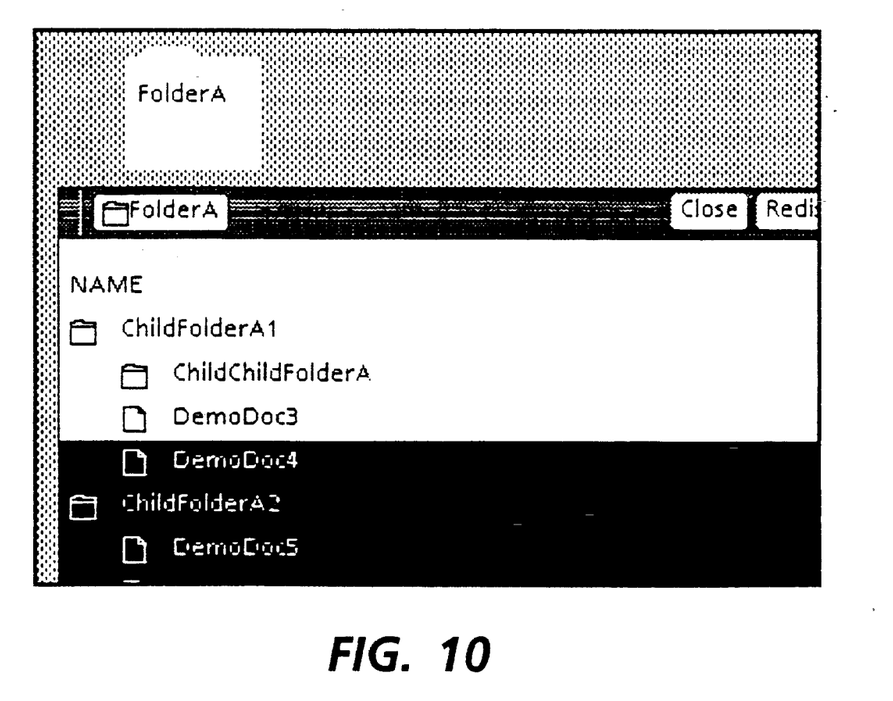
FIG. 10 is another example of file selection in accordance with the present invention.

Any time a folder is included in the selection, all the icons inside it will also be included in the selection. For example, in FIG. 9, if DemoDoc4 is selected, then attempts to extend the selection to include DemoDoc5 will also include ChildFolderA2 and all the icons within ChildFolderA2 including DemoDoc5, as shown in FIG. 10. Note that individual icons that have no other icons showing nested inside them may be selected and operated on as usual. Also, extending the selection within a folder works as usual, for example, selecting DemoDoc3 and extending to select DemoDoc4 would select just those two documents. Note that when a folder and the icons inside it are both visible and the icons are selected, the folder cannot be opened into a separate window (it is already "open"). Also, PROP'S will work normally. When icons are nested so deeply that they wrap around, selection highlighting still works properly - all the icons inside a folder are selected with the folder.

Icons can be moved and copied out of a window as usual. Also, as usual, when a folder is moved or copied, all the icons inside it are moved or copied as well. However, the visualization of this type if operation is easier with the nested hierarchical displays of the instant invention. Icons can be moved and copied onto individual icons in a hierarchically nested container display. Icons can also be moved and copied into a hierarchically nested container between items, as usual, but note that the behavior is often quite different from a nonhierarchically nested container display. Some examples will clarify the difference.

EXAMPLE 1

Ordinary Container Display

To Copy an icon, i.e. New Icon between FolderA and FolderB
    FolderA
    NewIcon
    FolderB
The new icon will be inserted between FolderA and FolderB.
    FolderA
    NewIcon
    FolderB

EXAMPLES 2, 3, 4

Nested Container Display

FolderA
    2 NewIcon
    Folder1 (Inside FolderA)
    3 NewIcon
    Folder2 (Inside FolderA)
    4 NewIcon
FolderB To copy an icon to position 2 (between FolderA and Folder1 Inside FolderA), the new icon will be inserted into FolderA, before Folder1 Inside FolderA:
FolderA
    NewIcon
    Folder1 (Inside FolderA)
    Folder2 (Inside FolderA)

Of course, if FolderA is sorted alphabetically from A to Z, then the new icon will appear in its appropriate position. This is true of the examples below as well.

To copy an icon to position 3 (between Folder1 (Inside FolderA) and Folder2 (Inside FolderA), the new icon will be inserted into FolderA:
FolderA
    Folder1 (Inside FolderA)
    NewIcon
    Folder2 (Inside FolderA)
FolderB To copy an icon to position 4 between Folder2 (Inside FolderA) and FolderB, the new icon will be inserted into FolderA:
FolderA
    Folder1 (Inside FolderA)
    Folder2 (Inside FolderA)
    NewIcon
FolderB Note that it is within the scope of this invention that NewIcon could be inserted at the same level as FolderA and FolderB.

Figure 11:
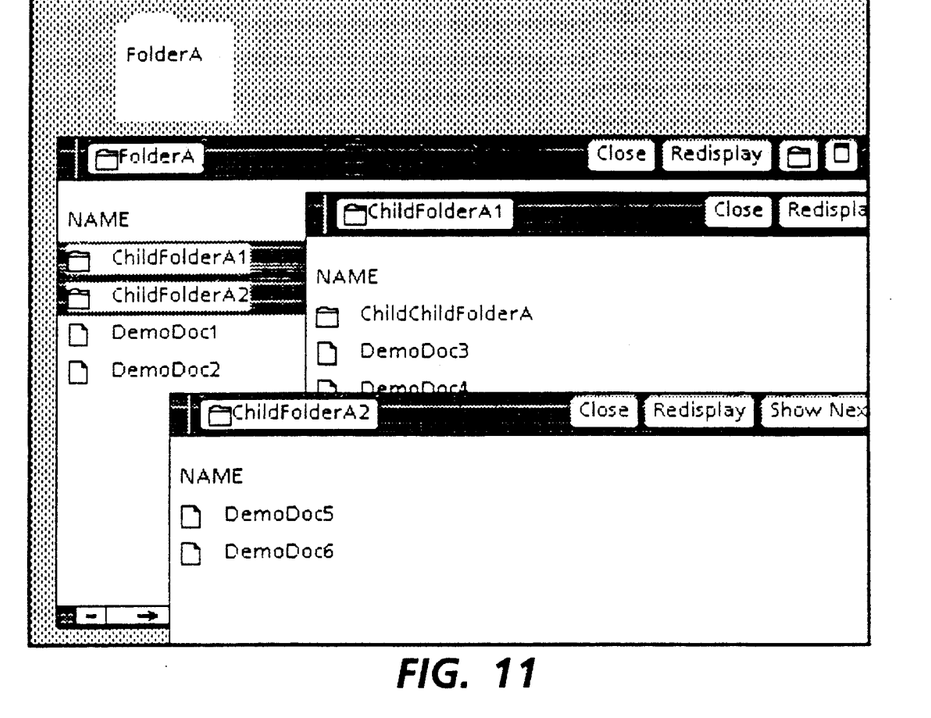
FIG. 11 is an example of Show Next and Show Previous in accordance with the present invention.

In accordance with another aspect of the present invention, the Folder/File Drawer Display Options sheet now has a new item, "Open Method" with these two choices: "Show All Levels", "Open Within" and "Open Next To", as illustrated in FIG. 11. Selecting "Open Within" means icons open by replacing the window containing the icon as in FIG. 4. Selecting "Open Next To" means icon will open into a separate window next to the window containing the icon as in FIG. 6. Note that this means several icons in an open folder window can be opened at the same time as illustrated in FIG. 11.

When "Open Next To" is used, the icon that was opened appears "busy" in the original window. This prevents the icon from being opened again, deleted, moved or copied, while it is open as illustrated in FIGS. 6 and 11. If the original window is closed, all windows "Open Next-To" it are also closed, automatically.

"Show Next" and "Show Previous" appear in the window "Open Next-To", and work as expected: the window in which "Show" is selected is replaced with the next icon from the original open folder window.

Figure 12:
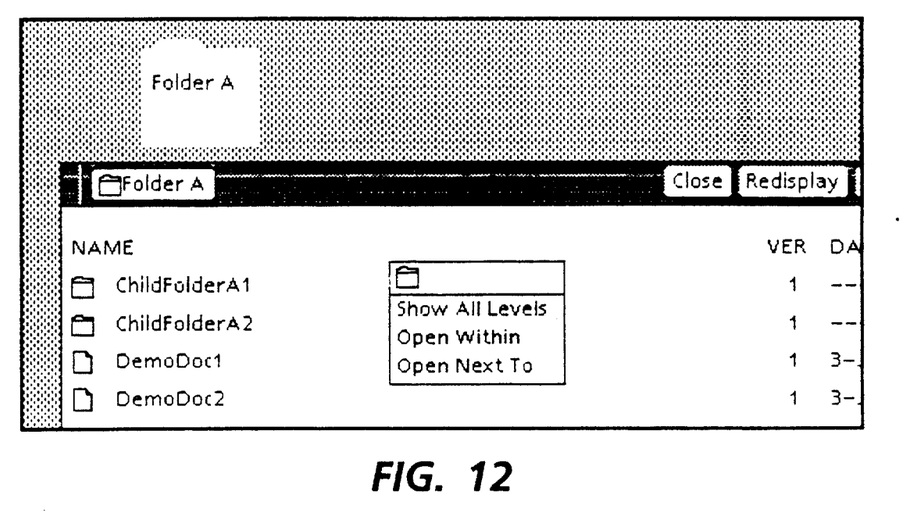
FIG. 12 is an example of the Display Option Sheet in accordance with the present invention.

It should be noted that within the scope of this invention, there are other ways to specify the "Open" method, for example:

(1) The default method can be specified in the User Profile:
[Folder-File Drawer)
Open Method: Open Within—or Open Next-To (2) Each icon in an open container can contain a pop-up menu with two menu items, "Open Within" and "Open Next-To". Selecting the appropriate menu item will open the icon either on top of the folder window, or next to the folder window. The pop-up menu for each icon is obtained by chording the mouse buttons (pressing both at once), or by holding down a shift key while pressing the left mouse button. FIG. 12 shows the pop-up menu over DemoDoc1.

Files or icons can be opened into a separate window rather than having an open icon completely obscure the window from which is was opened as illustrated in FIG. 6. As illustrated in FIG. 6, a first window displays the contents of Folder A, namely, ChildFolder A1, ChildFolderA2, DemoDoc3 and DemoDoc4. This is the same display as shown in FIG. 3. However, if the work station professional desired to display the contents of one of the files or documents in FolderA, for example, ChildFolderA1, the contents of ChildFolderA1 are display in a separate window. As illustrated, the file ChildChildFolderA, DemoDoc3, and DemoDoc4 contained within ChildFolderA are shown in a second window offset from the window containing the contents of FolderA.

According to another aspect of the present invention, a FIND capability enables finding of strings, text and icons in a folder display, including forward and backward search and automatic text type conversion based on selection. Text strings or data are extracted from an icon or file and converted to a form that enables the data to be found in the folder display. A typical scenario is to select an icon, position in cursor in the folder, press the FIND key for a find window, and the text name associated with that icon will then be searched for in the folder and highlighted or indicated in some manner if found. The method of finding and displaying files in an electronic workstation includes the step of displaying within the window a plurality of icons and related text representing a hierarchy of files and subfiles stored within the memory. The next step is selecting an icon disposed on the screen, said icon having associated text. Then the find switch is actuated to search and find the hierarchy of files and subfiles for text identical to the text associated with said icon.

While there has been illustrated and described what is at present considered to be a preferred embodiment of the present invention, it will be appreciated that numerous changes and modification are likely to occur to those skilled in the art, and it is intended in the appended claims to cover all those changes and modification which fall within the true spirit and scope of the present invention.

We claim:

1. The method of displaying hierarchical files in an electronic workstation having a screen display including icons and related text for identifying main files and associated subfiles stored in memory and a window segmenting a portion of the screen comprising the steps of:

displaying icons and related text of main files within the window beginning at a first margin in relation to a first edge of the window, displaying icons and a related text of a first sublevel of subfiles within the window beginning at a second margin in relation to said edge of the window, the second margin being indented from the first margin, displaying icons and related text of a second sublevel of subfiles within the window beginning at a third margin in relation to said edge of the window, the third margin being indented from the second margin, the window comprising a second edge spaced apart from the first edge and the icons and text of a third sublevel of indented subfiles extending beyond the second edge, including the step of folding the display to another portion of the window to display the icons and text of the third sublevel of subfiles beginning at said first margin, the icons and text of the third sublevel of subfiles being disposed below the icons and text of the second sublevel of subfiles, and displaying a fold indicator with the third sublevel of subfiles to manifest the folding of said third sublevel of subfiles to another portion of the window.

2. The method of claim 1 wherein the fold indicator is an icon disposed at said first margin adjacent the third sublevel of subfiles.

* * * * *